United States Patent
Kennedy, Jr.

(10) Patent No.: US 7,162,252 B2
(45) Date of Patent: Jan. 9, 2007

(54) METHOD AND APPARATUS FOR SUPPORTING MULTIPLE WIRELESS CARRIER MOBILE STATION LOCATION REQUIREMENTS WITH A COMMON NETWORK OVERLAY LOCATION SYSTEM

(75) Inventor: Joseph P. Kennedy, Jr., Great Falls, VA (US)

(73) Assignee: Andrew Corporation

( * ) Notice: Subject to any disclaimer, the term of this patent is extended or adjusted under 35 U.S.C. 154(b) by 325 days.

(21) Appl. No.: 10/739,023

(22) Filed: Dec. 19, 2003

(65) Prior Publication Data

US 2004/0132466 A1 Jul. 8, 2004

Related U.S. Application Data

(60) Provisional application No. 60/435,332, filed on Dec. 23, 2002.

(51) Int. Cl.
*H04Q 7/20* (2006.01)

(52) U.S. Cl. .................. 455/456.1; 455/422.1; 455/428; 455/404.2; 455/423; 455/446; 340/539.13; 342/450

(58) Field of Classification Search .. 455/456.1–456.5, 455/457, 428, 445–446, 435.2, 423, 422.1, 455/115.1, 67.11; 342/457–458, 450
See application file for complete search history.

(56) References Cited

U.S. PATENT DOCUMENTS

| | | | |
|---|---|---|---|
| 4,728,959 A | 3/1988 | Maloney et al. | |
| 4,845,504 A | 7/1989 | Roberts et al. | |
| 4,891,650 A | 1/1990 | Sheffer | |
| 5,056,106 A | 10/1991 | Wang et al. | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,404,376 A | 4/1995 | Dent | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,592,180 A | 1/1997 | Yokev et al. | |
| 5,675,344 A | 10/1997 | Tong et al. | |
| 5,697,055 A * | 12/1997 | Gilhousen et al. | 455/436 |
| 5,736,964 A | 4/1998 | Ghosh et al. | |
| 5,914,687 A | 6/1999 | Rose | |
| 5,945,948 A | 8/1999 | Buford et al. | |

(Continued)

*Primary Examiner*—Jean Gelin
*Assistant Examiner*—Kamran Afshar
(74) *Attorney, Agent, or Firm*—Duane Morris LLP

(57) ABSTRACT

A system and method supports multiple wireless carrier mobile station location requirements with a common network overlay location system. The common network overlay location system shares geolocation assets such as location measurement units (LMU), geo-location control system (GCS), and, optionally, mobile positioning centers (MPC). The shared location assets are configured to operate with each of the sharing carrier systems. The number of sharing carriers in the same market is not limited. LMUs are configurable and switchable to measure attributes of the transmitted signal from mobile stations belonging to any of the wireless carriers which are used by the common location system to estimate the location of the mobile station using time of arrival, time difference of arrival, angle of arrival, signal power, and combinations of the same. The location of the LMUs are configured to provide an acceptable level of accuracy while minimizing a function such as the need for additional LMUs and cost.

44 Claims, 6 Drawing Sheets

U.S. PATENT DOCUMENTS

| | | |
|---|---|---|
| 5,959,580 A | 9/1999 | Maloney et al. |
| 5,970,413 A | 10/1999 | Gilhousen |
| 6,047,192 A | 4/2000 | Maloney et al. |
| 6,097,336 A | 8/2000 | Stilp |
| 6,108,555 A | 8/2000 | Maloney et al. |
| 6,119,013 A | 9/2000 | Maloney et al. |
| 6,127,975 A | 10/2000 | Maloney |
| 6,184,829 B1 | 2/2001 | Stilp |
| 6,281,834 B1 | 8/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,366,241 B1 | 4/2002 | Pack et al. |
| 6,400,320 B1 | 6/2002 | Stilp et al. |
| 6,463,290 B1 | 10/2002 | Stilp et al. |
| 6,646,604 B1 | 11/2003 | Anderson |
| 6,956,527 B1 * | 10/2005 | Rogers et al. ............... 342/458 |
| 2004/0043775 A1 * | 3/2004 | Kennedy et al. .......... 455/456.2 |
| 2004/0087315 A1 * | 5/2004 | Dufva et al. .............. 455/456.1 |
| 2004/0121770 A1 * | 6/2004 | Tigerstedt et al. .......... 455/436 |
| 2004/0192336 A1 * | 9/2004 | Walby ..................... 455/456.1 |
| 2004/0259566 A1 * | 12/2004 | Maanoja et al. .......... 455/456.1 |
| 2005/0014500 A1 * | 1/2005 | Muhonen et al. ......... 455/456.1 |
| 2005/0192026 A1 * | 9/2005 | Carlson et al. ........... 455/456.1 |

* cited by examiner

METHOD AND APPARATUS FOR SUPPORTING MULTIPLE WIRELESS CARRIER MOBILE STATION LOCATION REQUIREMENTS WITH A COMMON NETWORK OVERLAY LOCATION SYSTEM

CROSS REFERENCES

This application is co-pending and claims benefit of Provisional Application entitled "Supporting Multiple Wireless Carrier Mobile Station Location Requirements with a Common Network Overlay Location System" Ser. No. 60/435,332 filed Dec. 23, 2002, the entirety of which is herein incorporated by reference.

This application is co-pending with and claims benefit of U.S. patent non-provisional application Ser. No. 10/230,333 filed Aug. 29, 2002, PCT patent application Ser. No PCTUS03-34143, filed Oct. 27, 2003 which claims benefit of U.S. Provisional Application Ser. No. 60/421,064 filed Oct. 25, 2002 and PCT patent application Ser. No. PCTUS-32584 filed Oct. 16, 2003 which claims benefit of U.S. Provisional application 60/418,342 filed Oct. 16, 2002, the disclosures of which are incorporated herein by reference.

BACKGROUND

The use of wireless communication devices such as telephones, pagers, personal digital assistants, laptop computers, etc., hereinafter referred to collectively as "mobile appliances" or "mobile stations" interchangeably, has become prevalent in today's society. Recently, at the urging of public safety groups, there has been increased interest in technology which can determine the geographic position, or "geolocate" a mobile appliance in certain circumstances. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. FIG. 1a shows a wireless communication network 100 with a typical network overlay location architecture.

Wireless communication systems typical include a mobile station (MS) 110, a plurality of base stations (BS) 120a–c, a base station controller (BSC) 130, and a mobile switching center (MSC) 140. The wireless communication system allows communication between the mobile station and the base station over an air interface as is well known in the art. The network overlay location system is made up of a plurality of local measurement units (LMU) 150, also known as wireless location sensors (WLS), a geo-location system controller (GCS), also known as a Serving Mobile Location Center (SMLC), 160 and a mobile positioning center (MPC), also known as a Gateway Mobile Location Center (GMLC), 170 and, depending on the air interface, an Abis measuring unit (AMU) 180. In this architecture, a wireless handset location is produced for a single carrier. FIG. 1b shows a representation of the system with a representative base station 120.

The LMUs 150a–c of the geo-location network overlay are generally located at the wireless service provider's base stations. The LMUs 150a–c take measurements on the radio signal emitted by the mobile station (MS) 110 under control of the GCS. The GCS is commanded to take locations and report locations by the MPC 170 for specific handsets. The AMU 180 provides information on the radio channel assignments for the mobile station for certain air interfaces (GSM, iDEN, for example, and others). For other air interfaces (IS-136, IS-95, AMPS, 1xrtt, for example, and others) the radio channel assignment information is provided by the MPC.

Mobile appliances do not all operate using a common wireless air interface protocol standard. The Telecommunications Industry of America ("TIA") and the European Telecommunications Standard Institute ("ETSI") are well known standards organizations, each publishing recognized wireless air interface protocol standards. As is known in the art, TIA and ETSI are two examples of standards bodies. Others include the Third Generation Partnership Project ("3GPP") and Third Generation Partnership Project 2 ("3GPP2"). In the past, mobile appliance geolocation implementations have been specific to the underlying wireless air interface protocol standard (i.e., network reference models, interfaces, messages, etc.) utilized by the mobile appliance being located.

In operation, typical network overlay location systems take measurements on radio frequency transmissions from the mobile station at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The radio frequency measurements of the transmitted signal at the base stations can include, for example, the time of arrival, time difference of arrival, the angle of arrival, the signal power, or the unique/repeatable radio propagation path (radio fingerprinting) derivable features. In addition, the geolocation systems can also use collateral information, e.g., information other than that derived from the radio frequency measurement to assist in the geolocation of the mobile appliance, i.e., location of roads, dead-reckoning, topography, map matching etc.

In a network-based geolocation system, the mobile appliance to be located is typically identified and radio channel assignments determined by (a) monitoring the control information transmitted on radio channel or wireline interface for telephone calls being placed by the mobile appliance to detect calls of interest, i.e., 911, (b) a location request provided by a non-mobile appliance source, e.g., an enhanced services provider. Once a mobile station to be located has been identified and radio channel assignments determined, the GCS may typically be tasked to determine the geolocation of the mobile appliance and then directed to report the determined position to the MPC (or the requesting entity or enhanced services provider).

The monitoring of the radio frequency transmissions from the mobile appliance to identify calls of interest is known as "tipping", and generally involves recognizing a call of interest being made from a mobile appliance and collecting the call setup information. Once the mobile appliance is identified and the call setup/channel assignment information is collected, the location determining system can be tasked to geolocate the mobile appliance.

It is often the case that several wireless communication systems or carriers occupy the same market or geographic region. However, the geo-location architecture shown in FIG. 1, would be unable to locate a mobile station which was not being provided service by the host wireless network because the MPC 140 would not be configured to task the GCS 160 to locate the call, and the AMU 180 would not have access to the radio channel assignments. Furthermore, the LMUs 150a–c may not have access to the radio frequency band for the operating MS. Thus, wireless carriers in a given market desiring to provide services related to mobile subscriber location where the mobile subscriber is either within the wireless carrier's system or on a different wireless system, would have to equip their network with location assets thereby unnecessarily duplicating assets and capability, all at a substantial cost. Therefore, there is a need for a geolocation system operable on multiple carriers.

In order to meet this need and obviate the deficiencies of the prior art, it is an object of the disclosed subject matter to provide a common network overlay system that can serve multiple carriers at a reduced cost and complexity over the normal practice of having a dedicated geo-location system.

It is also an object of the disclosed subject matter to present a novel network overlay geolocation system capable of geolocating a first and a second mobile station operating in a geographic area serviced by a first and a second wireless communication system, respectively. The system may include a plurality of LMUs, at least one MPC, and a geolocation controller, where the first mobile station communicates over the first wireless communication system and the second mobile station communicates over the second wireless communication system. The MPC of the system may be configured to task the geolocation controller to locate the first and/or second mobile station.

It is a further object of the disclosed subject matter to present a novel method for geolocating a target mobile station in a geographic area serviced by a plurality of wireless communication systems. The method may include transmitting a signal from the target mobile station to one of the wireless communication systems, tasking the geolocation controller to locate the target mobile, and configuring the LMUs to measure an attribute of the signal of the target mobile station based on call set up information for the call from the target mobile station and an attribute of the serving wireless communication system. The novel method locates the target mobile based at least in part on the measured attribute.

It is still another object of the disclosed subject matter to present a novel method for selecting a set of LMU locations from a plurality of possible LMU locations in a geographic area serviced by a plurality of wireless communication systems. The novel method includes the steps of modeling a coverage plan for each of the plural wireless communication systems over the geographic area, selecting plural LMU locations from the plurality of possible LMU locations to thereby provide a candidate set of LMU locations, and simulating the operational performance of each of the candidate sets of LMU locations over the geographic area for each of the plural wireless communication systems. The novel method may also compare the simulated operational performances of the candidate sets of LMU locations to thereby determine and select an optimal set of LMU locations, i.e., the set of LMU locations with an optimal simulated operational performance.

It is another object of the disclosed subject matter to present, in a network overlay geolocation system for determining the geolocation of mobile stations associated with a first wireless communication system having a first plurality of base stations where the geolocation system includes LMUs located at ones of the first plurality of base stations, a novel method for determining the geolocation of a mobile station associated with a second wireless communication system. The novel method includes (a) modeling a coverage plan for the second wireless communication system using said LMUs to thereby obtain a simulated geolocation performance parameter, (b) evaluating the simulated parameter and if the evaluation is unacceptable, modeling the coverage plan for the second wireless communication system using said LMUs and at least one additional LMU located at a base station associated with the second wireless communication system to thereby obtain a simulated geolocation performance parameter, (c) repeating step (b) until the evaluation is acceptable, and (d) locating said at least one additional LMU at the base station associated with the second wireless communication system according to the remodeled coverage plan so as to determine the geolocation of a mobile station associated with the second wireless communication system.

It is yet another object of the disclosed subject matter to present, in a network overlay geolocation system for determining the geolocation, within a predetermined accuracy, of mobile stations associated with a first wireless communication system, a novel method for determining the need for additional LMU(s) to determine the geolocation, within the predetermined accuracy, of a mobile station associated with a second wireless communication system. The novel method may include modeling a coverage plan for the second wireless communication system using the LMUs of the first wireless communication system to thereby simulate the accuracy of a geolocation determination of a mobile station associated with the second wireless communication system. The method may also include evaluating the simulated accuracy against the predetermined accuracy and if the evaluation is unacceptable, modeling the coverage plan for the second wireless communication system using the LMUs of the first wireless communication system and at least one additional LMU located at a base station associated with the second wireless communication system to thereby simulate the accuracy of the geolocation determination of the mobile station associated with the second wireless communication system. The method additionally may include repeating the previous step until the evaluation is acceptable to thereby determine the need for an additional LMU.

It is still another object of the disclosure to present an improved network overlay geolocation system for locating a first mobile station associated with a first wireless communication system covering a geographic area. The improved system may include configuring the geolocation system to locate a second mobile station associated with a second wireless communication system covering at least a portion of the geographic area.

These and many other objects and advantages of the present invention will be readily apparent to one skilled in the art to which the disclosure pertains from a perusal of the claims, the appended drawings, and the following detailed description of the preferred embodiments.

DETAILED DESCRIPTION

A common network overlay geolocation system is described herein that serves many wireless carriers in a given market or portion thereof. The system can be owned and operated by one carrier in the market, or ownership/operation could also be shared or provided by a third party.

The common (or shared) network overlay geolocation system provides service to wireless carriers which may operate in different radio frequency bands, use different air interfaces, have base stations at different physical locations, and adhere to different recognized standards bodies' specifications. The disclosed subject matter also discloses means to provide certain qualities of service (e.g., statistical location accuracy) while minimizing some function (e.g., total cost, number of new antennas installations, etc.) using a planning tool approach.

Figure 1A:
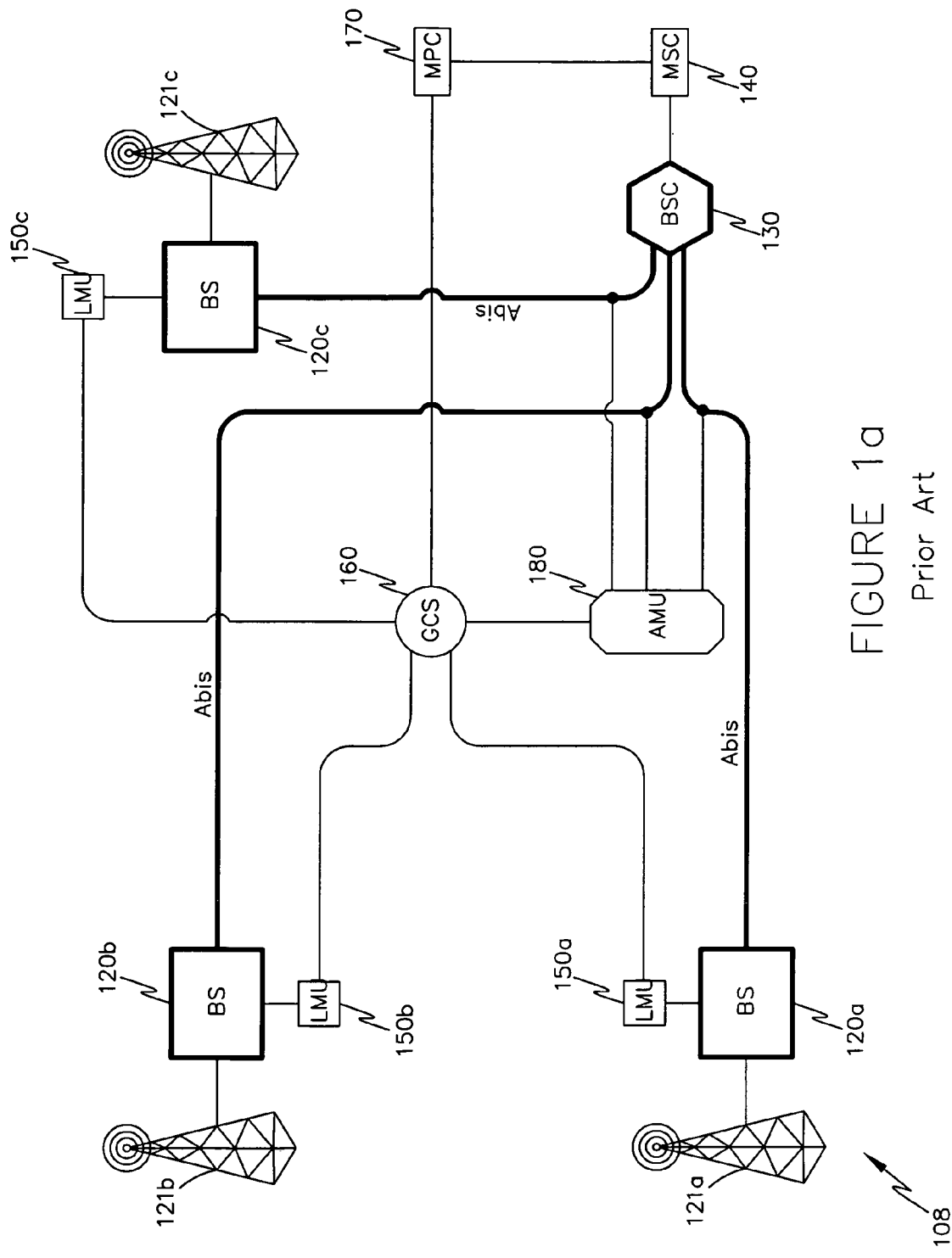
FIG. 1a is a representation of a typical geolocation architecture for a network overlay geo-location system.
Figure 1B:
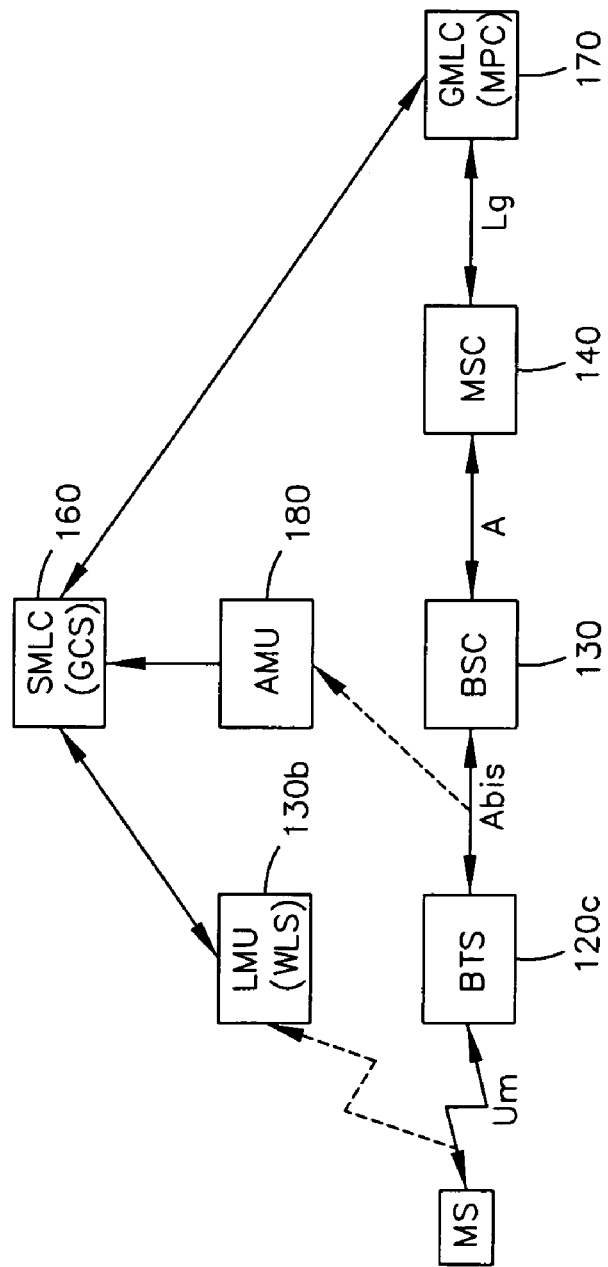
FIG. 1b is a simplified representation of the typical geolocation architecture of FIG. 1a with a representative base station.
Figure 2:
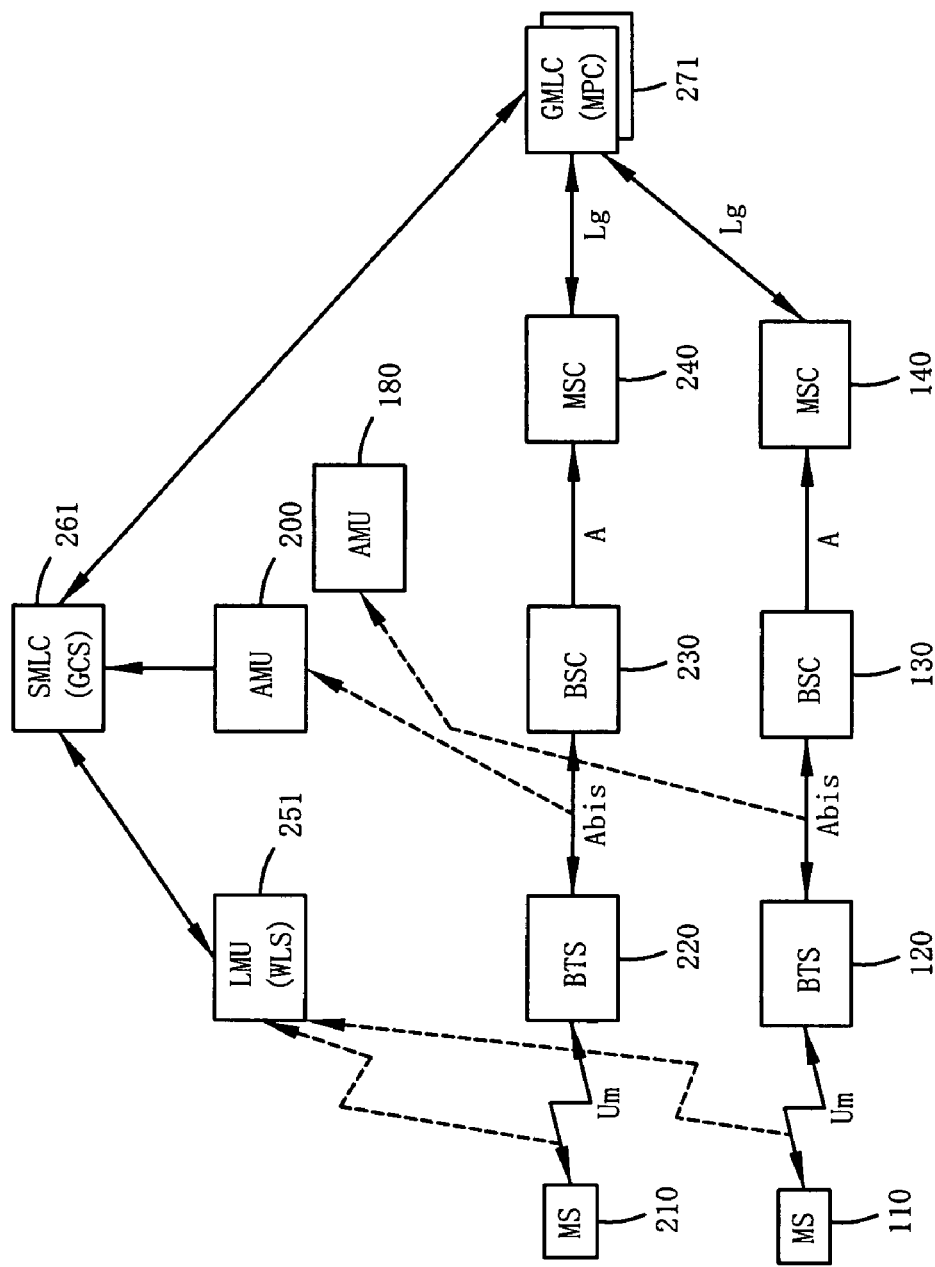
FIG. 2 is a representation of the architecture for a common network overlay geo-location system according to an embodiment of the disclosed subject matter.

FIG. 2 is a representation of a shared location system architecture. In FIG. 2, only two carrier systems are shown for purposes of clarity, however one of skill in the art will immediately recognize that a shared location system serving multiple carriers in a geographic area is equally operable and envisioned. FIG. 2 shows the first wireless carrier, as described in FIG. 1, along with some system assets of a second carrier system. The second carrier includes a wireless communication system with a plurality of base stations represented as base station 220, a base station controller 230 and a mobile switching center 240 for communication with mobile station 210. The shared geolocation assets of the common geolocation system include a plurality of LMUs represented as LMU 251 and a shared GCS 261. The common geolocation system can have a single shared AMU or dedicated AMUs 180 and 280 for the first carrier and the second carrier, respectively. Additionally, the MPC 271 can be a shared asset or a set of dedicated MPCs, one for each of the carriers, operable to communicate with the shared GCS 261.

The LMUs represented by LMU 251 provide location measurement functionality for both sets of mobile stations 110 and 210. If the mobile stations 110 and 210 are operating in different radio frequency bands, the LMU 251 is configured to tune to the correct radio frequency band depending on the tasking received form the GCS 261 or other source. If the mobile stations 110 and 210 use different air interfaces such as TIA and ETSI, the LMU contains additional software or hardware to enable the LMU 251 to measure signal attributes from each of the air interfaces and to select the correct processing algorithms depending on the tasking from, for example, the GCS 261. The tasking from the GCS 261 advantageously includes information to direct the LMU 251 to configure itself to the proper air interface. The architecture shown, as noted previously, is extensible to more than two wireless networks and could operate for many or all of the wireless service providers in a given market, geographic area, or portion of either or both.

The shared GCS 261 can serve multiple wireless service providers by duplicating certain connections to gain tasking and reporting access. The GCS 261 can also be configured to arbitrate multiple requests and responses by either time serializing the location events or following one of many known prioritization schemes including those based on the ultimate use of the estimated location (e.g., E911 requirements may receive priority over commercial location services).

In the case where an AMU is needed, the AMU can be duplicated for each wireless network as shown in FIG. 2. This approach is generally necessary so that the channel assignment data for all wireless networks served is available. In general, the AMU 180 and 280 are co-located with the BSC 130 and 230, respectively, and attempting to use one to serve multiple wireless carriers may be inefficient from a communications facilities standpoint, but is not precluded. The GCS 261 relates the data coming from multiple AMUs to the correct wireless carrier by associating the data from the AMU 180 and 280 for a particular wireless carrier only with the location requests for that carrier.

The MPC function can either be duplicated or common. The GCS 261 can operate with one MPC 271, as shown in FIG. 2, that is receiving tasking and call information from multiple switches MSCs 140 and 240 and/or from enhanced services clients (not shown), or can be configured to interface with multiple MPCs that each individually serve one of the multiple wireless carriers. In a common geolocation system serving wireless carriers that use air interfaces that are governed by different standards organizations, the interface between the MPC and the GCS 261 is therefore necessarily different (E5 for TIA air interfaces, Ls/Lg for ETSI/3GPP air interfaces). In such a common geolocation system, the GCS 261 is configured with software or hardware enabling the capability to accommodate the different interfaces and perform the same serialization or prioritization as previously discussed. The GCS to MPC interface also supports augmentations to standard interfaces to support tasking and reporting from entities governed by different standards bodies.

The common geolocation system can be shared by many possible combinations of wireless carriers occur including: Cellular phone system ("Cellular")—Cellular, Cellular—personal communication system ("PCS"), PCS-Cellular, PCS—PCS, Cellular—Cellular-PCS and PCS-Cellular-PCS, as well as others. Those of skill in the art should realize that the foregoing list is included for illustration purposes only and that the subject matter of the disclosure is not limited to those wireless carrier combinations listed.

In the foregoing list, the first radio frequency band listed is the radio frequency band in which the host base station operates, and the second (or third) radio frequency band is the radio frequency band in which the sharing wireless carrier operates. For example, in the first combination (Cellular—Cellular), the host carrier operates in the cellular band (e.g., 800/900 MHz) and the sharing wireless carrier also operates in the cellular band (e.g., 800/900 MHz). In the second combination (Cellular-PCS), the sharing carrier operates in the PCS band (e.g., 1900 MHz). The third fourth, fifth, etc., radio frequency bands listed for a given combination refer to additional shared wireless carrier band assignments.

Figure 3:
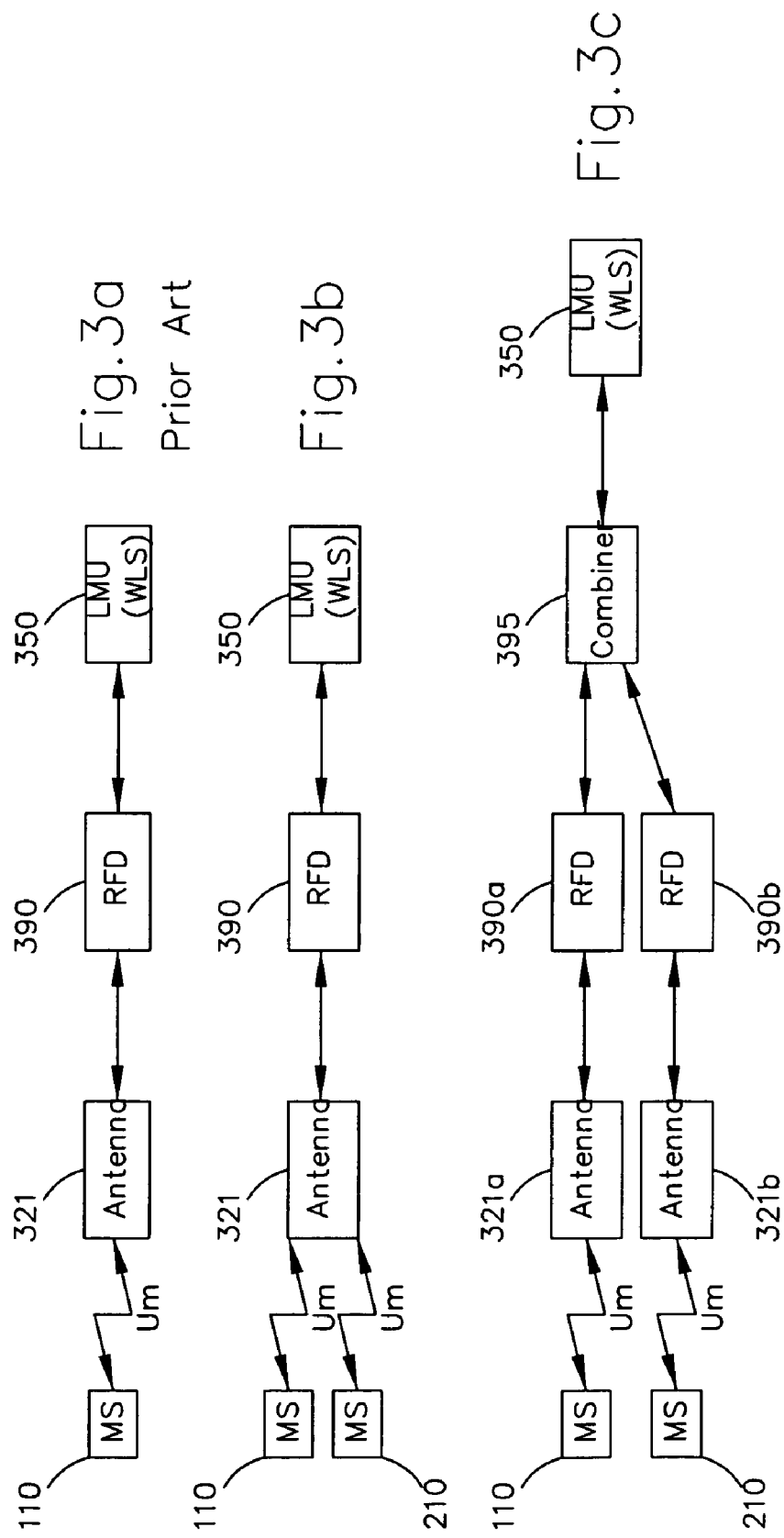
FIG. 3a is a representation of a dedicated prior art LMU and antenna configuration.
FIG. 3b is a representation of a LMU and antenna configuration according to an embodiment of the disclosed subject matter.
FIG. 3c is a representation of a LMU and multiple antenna configuration according to an embodiment of the disclosed subject matter.

The LMU may or may not have access to the radio frequency bands necessary to operate in a shared mode, based on its radio frequency connections at the base station. In the dedicated (one wireless carrier support) mode as shown in FIG. 3a, the LMU 350a is generally connected through the multicouplers, or radio frequency distribution, (RFD) 390 of the host infrastructure equipment to the existing antenna system 321 that supports wireless communications services. The RFD 390a may include some radio frequency filtering, but the antenna system 321 may or may not provide sufficient gain necessary to support radio frequency bands other than that of the host system. To address the different combinations, e.g., the types of host antenna system band coverage and the RFD filtering, several configurations can be implemented to facilitate the use of the host LMU in a shared geolocation system.

FIG. 3b shows the host mobile station 110 being received through the antenna system 321 and RFD 390 combination into the LMU 350, and a sharing wireless carrier's mobile station 210 operating through the existing antenna/RFD. Multiple sharing carriers in the same radio frequency band can operate in this way as well as wireless carriers whose frequency bands are within the operating band of the antenna system and RFD, such as the Cellular—Cellular and PCS—PCS combinations. FIG. 3c shows multiple antenna systems 321a and 321b and RFDs 390a and 390b supporting a host mobile station 110 and shared mobile station 210 being combined through an antenna combiner 395 to be fed into the LMU 350. Antenna 321 may be solely for receiving the radio frequency band of the shared mobile station 220 where the frequency band of the mobile station 110 and the mobile station 210 may be the same or different. This configuration could be used with more than two sets of different Antennas/RFDs to support more than two carriers, and could be used in combination with the configuration of FIG. 3b to support combinations of host and sharing carriers who operate both in and out of a particular frequency band. Of course, the host and sharing carriers could be using common or different air interfaces, supported by the LMU based on the tasking from the GCS.

The location measurements made by the LMU may include both time of arrival related measurements (TOA), time difference of arrival related measurements (TDOA), angle of arrival related measurements (AOA), or a combination thereof. In shared geolocation systems where AOA is used, the LMU may have access to the radio frequency emissions for the target MS through a dedicated multi-element antenna array. The same considerations for antenna sensitivity and RFD filtering apply to these systems as addressed above.

A necessity in providing shared wireless location services is providing a specific grade of service required by the participating wireless carriers. The standard practice in the industry is to design the location network overlay system with a planning tool that will predict performance based on where the LMUs are located. For example, for a typical prior art dedicated network overlay location system, a planning tool predicts the location accuracy based on locating LMUs at each of the host wireless carrier's base stations. In the case of shared location approaches, the host carrier's wireless base stations and the sharing carrier's wireless base stations may not be collocated. If a prediction is made of the location performance for the host carrier, it may not apply to the sharing carrier, and the performance for the shared mobile stations may not be adequate, depending on the degree of co-location of the two carriers' base stations. For example, mobile station transmit power may vary between a mobile station on the host carrier system and a mobile station on the shared carrier system.

To enable the wireless carriers to share geolocation assets in a common geolocation system of the present disclosure, the geo-location provider must be able to predict the performance of the shared network for the sharing carrier and, if necessary, provide some additional LMUs at the base station locations of the shared carrier to improve performance of the common geolocation system regarding the shared carrier. Additionally, if there is no "host carrier", and the carriers who wish to share the network are each willing to make available some number of base stations to host LMUs, then another aspect of the disclosure is to be able to select base station locations from the base stations of each of the sharing carriers in order to meet grade of service requirements for all the sharing carriers while minimizing some function (e.g., number of total base stations used, number of new antennas needed, cost, etc.).

These aspects are accomplished by using a planning tool that predicts location accuracy for a single wireless carrier through a computer simulation. The prior art contains various planning processes with various features. In general, the process includes determining the locations of the base station sites where LMUs may be placed by using, for example, information about radio frequency propagation and how the power of the mobile stations is managed by the wireless network in question. Location accuracy for the market area or geographic area for the signal wireless carrier can be determined by combining location accuracy predictions for specific locations over the entire market area. In the prior art systems, the operator can choose to populate some base stations and not others, or use different types of equipment at different base stations (e.g., whether to use an AOA capable antenna) to arrive at a market area design that minimizes some function while meeting a grade of service requirement (usually location accuracy). However, the prior art methodology may not translate to the performance prediction for shared geolocation systems.

An innovation required for the shared application is the ability to predict the location accuracy for different wireless carriers from the same model of the common network overlay location system. Each wireless carrier must be modeled independently because, depending on their specific air interface and the locations of their base station sites, the emitted power of one mobile station may differ from power emitted from the mobile station of another wireless carrier at the same physical location in the market. As is known in the art, emitted power from a mobile station has a first order affect on location accuracy. Therefore, part of the methodology for predicting accuracy of a shared geolocation system is the ability to predict location accuracy independently for the wireless carriers in the shared arrangement, using one carrier's base stations or combinations of base stations from the carriers, and selecting the base station compliment to minimize some function such as, for example, minimum number of base stations used, minimum number of new antennas required, or cost. In predicting accuracy, the inventive model may take into account such criteria as the air interface in use and the base station locations of the carriers (which may not be the same as the network overlay location system base stations used) to model uplink power as part of the location accuracy performance prediction.

Figure 4:
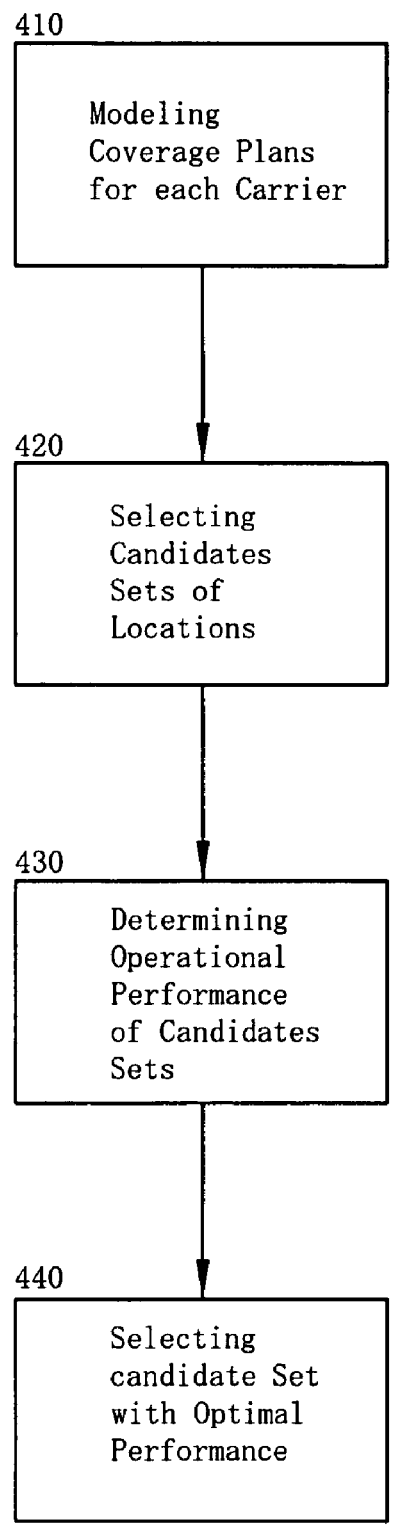
FIG. 4 is an illustrative flow chart for locating LMUs according to an embodiment of the disclosed subject matter.

An embodiment of a planning tool methodology for selecting LMU locations from a set of available base station locations from each of the carriers in a geographic area serviced by the sharing of wireless communication overlay system is shown in FIG. 4. The methodology models independent coverage plans for each of the carriers in the geographic area as shown in block 410. The modeling may take into account factors such as mobile station transmitter power, radio frequency propagation, topology, and LMU locations. Several candidate sets of LMU locations are chosen from the available base station locations as shown in block 420 where each candidate set includes a unique set of, for example, the number of LMUs and/or the particular locations in which to place an LMU. The candidate sets may contain, for example, all the LMU locations of one carrier and another candidate set may contain, for example, all the LMU locations of the other carrier. Still another candidate set may include combinations of LMU locations of various quantities and in various ratios. The planning tool then determines the operational performance of each of the candidate LMU location sets over the geographic area for each of the carriers as shown in block 430. The planning tool then compares the simulated operational performances of the candidate LMU location sets and selects the candidate LMU set with the optimal simulated operation performance as the locations to place the LMUs, as shown in block 440. The optimal operation performance can be a function of, for example, location accuracy, the number of LMU needed, a predetermined distribution of LMUs among the sharing carriers, or other parameters.

Figure 5:
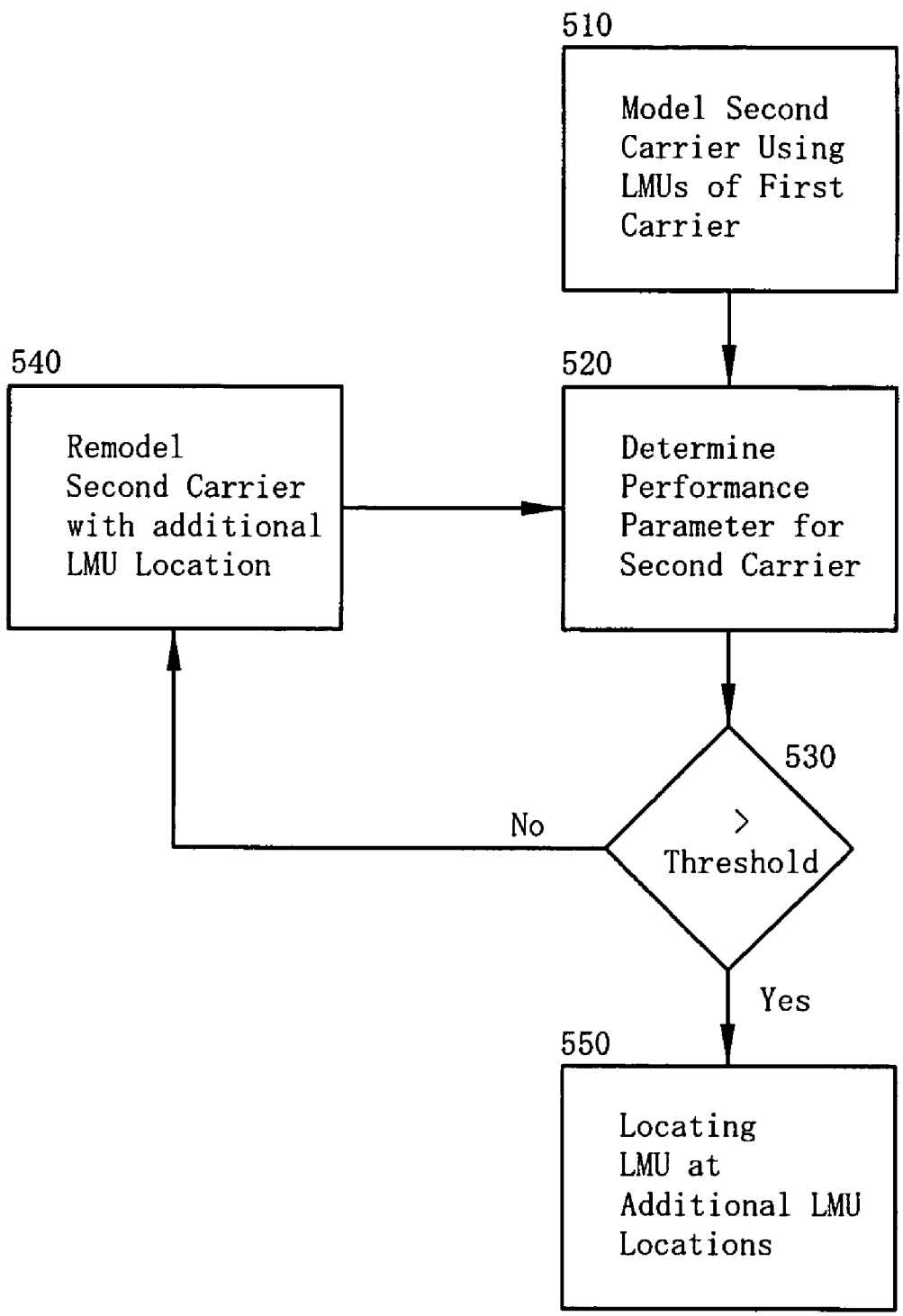
FIG. 5 is an illustrative flow chart for locating an LMU in a shared carrier system according to an embodiment of the disclosed subject matter.

An embodiment for configuring a network overlay geolocation system of a first carrier to be a shared geolocation system for a second carrier is shown in FIG. 5. The method models a coverage plan for the second wireless communication system (i.e., the second carrier) using the LMUs currently used by the first carrier, as shown in block 510. In block 520, a simulated geolocation performance parameter is determined. The simulated parameter is compared to a threshold in block 530. If the threshold is not met, the second carrier is remodeled, for example by adding additional LMU locations at the base station locations of the second carrier as shown in block 540. The simulated geolocation performance parameter is determined for the remodeled second carrier in block 520.

The additional LMU locations may be selected, for example, by taking into account each of the base stations of the second carrier one at a time, by a predetermined methodology for accounting for combinations of two or more base stations, or by an operator choosing any number of base stations to add to the previously-existing set of base stations. It should be apparent to one skilled in the art that there are a multitude of ways to add additional LMUs in order to model the second carrier.

The process continues this iteration until the performance parameter for the second carrier is accepted against the threshold. If the performance parameter is acceptable, LMUs may be physically located at the additional LMU locations of the second carrier as shown in block 550. The result is a shared or common network overlay system capable of geolocating mobile stations from either the first or second carrier within a predetermined accuracy.

The planning tool or process according to the disclosed subject matter is preferably implemented by a computer or other processor, since a large number of LMU location permutations and optimization of a performance parameter is desirable.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

I claim:

1. A network overlay geolocation system capable of geolocating a first and a second mobile station operating in a geographic area serviced by a first and a second wireless communication system, respectively, where each communication system includes plural base stations, a base station controller, and a mobile switching center; the geolocation system comprising:
a plurality of local measurement units ("LMUs");
at least one mobile positioning center ("MPC"); and,
a geolocation controller ("GCS");
wherein the first mobile station is configured to communicate over the first wireless communication system and the second mobile station is configured to communicate over the second wireless communication system and wherein the mobile positioning center is configured to task the GCS to locate the first or second mobile station further comprising a monitoring unit configured to obtain call set up information from one of the first or second wireless communication systems and configured to provide the call set up information to the GCS.

2. The network overlay geolocation system of claim 1 wherein said monitoring unit is configured to obtain call set up information from both the first and the second wireless communication systems.

3. The network overlay geolocation system of claim 1 further comprising a second monitoring unit configured to obtain call set up information from the other of the first or second wireless communication systems and configured to provide the call set up information to the GCS.

4. A network overlay geolocation system capable of geolocating a first and a second mobile station operating in a geographic area serviced by a first and a second wireless communication system, respectively, where each communication system includes plural base stations, a base station controller, and a mobile switching center; the geolocation system comprising:
a plurality of local measurement units ("LMUs");
at least one mobile positioning center ("MPC"); and,
a geolocation controller ("GCS");
wherein the first mobile station is configured to communicate over the first wireless communication system and the second mobile station is configured to communicate over the second wireless communication system and wherein the mobile positioning center is configured to task the GCS to locate the first or second mobile station wherein the plurality of LMUs are configured to obtain attribute measurements from both the first and second mobile stations.

5. The network overlay geolocation system of claim 4 wherein the attribute is selected from the list consisting of frequency band, air interface, and protocol standards.

6. A network overlay geolocation system capable of geolocating a first and a second mobile station operating in a geographic area serviced by a first and a second wireless communication system, respectively, where each communication system includes plural base stations, a base station controller, and a mobile switching center; the geolocation system comprising:
a plurality of local measurement units ("LMUs");
at least one mobile positioning center ("MPC"); and,
a geolocation controller ("GCS");

wherein the first mobile station is configured to communicate over the first wireless communication system and the second mobile station is configured to communicate over the second wireless communication system and wherein the mobile positioning center is configured to task the GCS to locate the first or second mobile station further comprising a first antenna array located at one of the plural base stations of the first wireless communication system and configured to communicate with the second mobile station.

7. The network overlay geolocation system of claim 6 wherein one of the plural LMUs is located at said one of the plural base stations of the first wireless communication system and wherein said LMU is switchably connected to said first antenna array and to a second antenna array configured to communicate with the first mobile station.

8. The network overlay geolocation system of claim 7 where the switch is a processor.

9. A network overlay geolocation system capable of geolocating a first and a second mobile station operating in a geographic area serviced by a first and a second wireless communication system, respectively, where each communication system includes plural base stations, a base station controller, and a mobile switching center; the geolocation system comprising:
   a plurality of local measurement units ("LMUs");
   at least one mobile positioning center ("MPC"); and,
   a geolocation controller ("GCS");
   wherein the first mobile station is configured to communicate over the first wireless communication system and the second mobile station is configured to communicate over the second wireless communication system and wherein the mobile positioning center is configured to task the GCS to locate the first or second mobile station wherein the geolocation system is further configured to locate a third mobile station served by a third wireless communication system in said geographic area.

10. A method for geolocating a target mobile station in a geographic area serviced by a plurality of wireless communication systems each having plural base stations for communicating with a plurality of mobile stations where the plural wireless communication systems are operably connected to a network overlay geolocation system having a plurality of LMUs and a GCS, the method comprising the steps of:
   transmitting a signal from the target mobile station to one of the plurality of wireless communication systems to thereby place a call from the target mobile station;
   tasking the GCS to locate the target mobile;
   configuring the LMUs to measure an attribute of the signal transmitted by the target mobile station based on call set up information for the call from the target mobile station and an attribute of the serving wireless communication system; and,
   locating the target mobile based in part on the measured attribute.

11. The method of claim 10 wherein the call from the target mobile station is sourced from the base station.

12. The method of claim 10 wherein the call from the target mobile station is sourced from the target mobile station.

13. The method of claim 10 wherein the attribute of the serving wireless communication system is frequency band.

14. The method of claim 10 wherein the attribute of the serving wireless communication system is an air interface.

15. The method of claim 10 wherein the call setup information is derived from monitoring an Abis signal.

16. The method of claim 10 wherein the call setup information is derived from a Mobile Positioning Center operably connected to the serving wireless communication system.

17. A method for selecting a set of LMUs locations from a plurality of possible LMUs locations in a geographic area serviced by a plurality of wireless communication systems, comprising the steps of:
   modeling a coverage plan for each of the plural wireless communication systems over the geographic area;
   selecting LMUs from the plurality of LMUs to thereby provide plural candidate LMU sets;
   simulating the operational performance of each of the candidate LMU sets over the geographic area for each of the plural wireless communication systems; comparing the simulated operational performances of the candidate LMU sets to thereby determine the candidate LMU set with an optimal simulated operational performance; and
   selecting the candidate LMU set with the optimal simulated operational performance.

18. The method of claim 17 wherein the candidate LMU set selected is used for designing a network overlay geolocation system.

19. The method of claim 17 wherein the candidate LMU set selected is used for a specific location event.

20. The method of claim 17 wherein the operational performance is location accuracy.

21. The method of claim 17 wherein the step of modeling is based on one of mobile station transmitter power, radio frequency propagation, or LMU location.

22. The method of claim 17 wherein each of the plurality of wireless communication systems includes a subset of said plurality of LMUs.

23. The method of claim 22 wherein the subset of LMUs associated with one of the plurality of wireless communication systems is comprised of LMUs not associated with others of the plurality of wireless communication systems.

24. The method of claim 23 wherein one of the plural candidate LMU sets comprises LMUs associated with one of the plurality of wireless communication systems.

25. The method of claim 23 wherein the LMUs associated with one of the plurality of wireless communication systems are located at base stations associated with said one wireless communication system.

26. The method of claim 17 wherein the step of simulating the operational performance of the candidate LMU sets is based in part on minimizing a predetermined operational parameter.

27. The method of claim 26 wherein the operation parameter being minimized is selected from the set consisting of cost and the number of LMUs.

28. In a network overlay geolocation system for determining the geolocation of mobile stations associated with a first wireless communication system having a first plurality of base stations where the geolocation system includes LMUs located at ones of the first plurality of base stations, a method for determining the geolocation of a mobile station associated with a second wireless communication system having a second plurality of base stations, comprising the steps of:
   (a) modeling a coverage plan for the second wireless communication system using said LMUs to thereby obtain a simulated geolocation performance parameter;

(b) evaluating the simulated parameter and if the evaluation is unacceptable, modeling the coverage plan for the second wireless communication system using said LMUs and at least one additional LMU located at a base station associated with the second wireless communication system to thereby obtain a simulated geolocation performance parameter;

(c) repeating step (b) until the evaluation is acceptable; and (d) locating said at least one additional LMU at the base station associated with the second wireless communication system according to the remodeled coverage plan so as to determine the geolocation of a mobile station associated with the second wireless communication system.

29. The method of claim 28 wherein the simulated geolocation performance parameter is location accuracy.

30. The method of claim 28 wherein the first plurality of base stations is unique from the second plurality of base stations.

31. The method of claim 28 wherein ones of the base stations in the first plurality of base stations are the same as ones of the base stations in the second plurality of base stations.

32. The method of claim 28 wherein an LMU is located at each base station of the first plurality of base stations.

33. The method of claim 28 wherein the simulated parameter is evaluated against a predetermined threshold.

34. The method of claim 28 wherein the first and second wireless communication systems have different air interfaces.

35. The method of claim 28 wherein the modeling of the coverage plan for the second wireless communication system is based at least in part on at least one of radio frequency propagation, LMU location, and power emitted by the mobile station being geolocated.

36. In a network overlay geolocation system for determining the geolocation, within a predetermined accuracy, of mobile stations associated with a first wireless communication system having a first plurality of base stations where the geolocation system includes LMUs located at ones of the first plurality of base stations, a method for determining the need for an additional LMU so as to determine the geolocation, within the predetermined accuracy, of a mobile station associated with a second wireless communication system having a second plurality of base stations, comprising the steps of:

(a) modeling a coverage plan for the second wireless communication system using said LMUs to thereby simulate the accuracy of a geolocation determination of a mobile station associated with the second wireless communication system;

(b) evaluating the simulated accuracy against the predetermined accuracy and if the evaluation is unacceptable, modeling the coverage plan for the second wireless communication system using said LMUs and at least one additional LMU located at a base station associated with the second wireless communication system to thereby simulate the accuracy of the geolocation determination of the mobile station associated with the second wireless communication system; and (c) repeating step (b) until the evaluation is acceptable to thereby determine the need for an additional LMU.

37. A network overlay geolocation system for locating a first mobile station associated with a first wireless communication system covering a geographic area, where the overlay system includes a GCS configured for tasking by a mobile positioning center ("MIPC") to locate the first mobile station, and further includes a plurality of LMUs for measuring an attribute of a signal emitted by the first mobile station, and where the geolocation of the first mobile station is estimated based in part on the measured attribute, the improvement comprising wherein the geolocation system is configured to locate a second mobile station associated with a second wireless communication system covering at least a portion of the geographic area.

38. The system of claim 37 wherein the MPC comprises a first and second MPC, wherein the first MPC is configured to task the GCS to locate the first mobile station and the second MPC is configured to task the GCS to locate the second mobile station.

39. The system of claim 37 wherein the first wireless communication system is configured to communicate with the first mobile station over a first air interface and the second wireless communication system is configured to communicate with the second mobile station over a second air interface.

40. The system of claim 39 wherein the first air interface is different from the second air interface.

41. The system of claim 37 further comprising a monitoring unit configured to obtain call set up information from the first and second wireless communication systems and configured to provide the call set up information to the GCS.

42. The system of claim 37 wherein the plurality of LMUs are configured to obtain measurements from both the first and second mobile stations.

43. The system of claim 37 wherein the first and second wireless communication systems operate over different frequency bands.

44. The system of claim 37 wherein the geolocation system is configured to locate a third mobile station associated with a third wireless communication system in the geographic area.

* * * * *